July 14, 1953 J. W. CHRISTENSEN 2,645,678

COLOR TELEVISION

Filed Jan. 6, 1951 4 Sheets-Sheet 1

INVENTOR
JOHN W. CHRISTENSEN
BY
Rennie, Edmonds, Morton, Barrows and Taylor
ATTORNEYS July 14, 1953 J. W. CHRISTENSEN 2,645,678

COLOR TELEVISION

Filed Jan. 6, 1951 4 Sheets-Sheet 2

INVENTOR
JOHN W. CHRISTENSEN
BY
Rennie, Edmonds, Morton, Barrows and Taylor
ATTORNEYS INVENTOR
JOHN W CHRISTENSEN
BY
Pennie, Edmonds, Morton, Barrows and Taylor
ATTORNEYS July 14, 1953 J. W. CHRISTENSEN 2,645,678

COLOR TELEVISION

Filed Jan. 6, 1951 4 Sheets-Sheet 4

INVENTOR
JOHN W. CHRISTENSEN
BY Pennie, Edmonds, Morton, Barrows and Taylor
ATTORNEYS Patented July 14, 1953 2,645,678

UNITED STATES PATENT OFFICE 2,645,678

COLOR TELEVISION

John W. Christensen, Forest Hills, N. Y., assignor to Columbia Broadcasting System, Inc., New York, N. Y., a corporation of New York Application January 6, 1951, Serial No. 204,769

23 Claims. (Cl. 178—5.4)

This invention relates primarily to color television, particularly to color television apparatus employing a moving filter element, and provides an improved system for effecting synchronization of the filter. In its broader aspects, however, it can be used for the precise synchronization of apparatus in other fields. In the field of color television, while especially designed and adapted for use in receivers, it can also be applied to transmitters.

In the sequential type of color television system, different primary colors of an object field are successively transmitted and reproduced. At the transmitter, an object field is scanned successively for different primary colors to produce a video signal having successive portions representing different color-separation values. This video picture signal is transmitted along with suitable synchronizing signals in fixed time relationship therewith. The synchronizing signals will ordinarily contain portions for line and field synchronization, and may contain distinctive portions for color synchronization. At the receiver, the different color-separation values represented by the video signal are successively reproduced and exhibited in their respective colors.

Three primary colors are almost universally employed at the present time to secure adequate color fidelity. Commonly, successive field scansions correspond to different primary colors and interlaced scansion is preferred. Such a system has been described in United States Patent No. 2,480,571, issued August 30, 1949, to Peter C. Goldmark, and has been found satisfactory in practice.

In apparatus at present employed, a moving filter element, such as a rotating disk, drum or similar element, is commonly utilized at the transmitter in cooperation with the scanning device to present different color-separation values successively thereto. At the receiver a similar filter element is employed, usually in cooperation with a cathode-ray receiver tube, to exhibit successive color-separation images in their respective colors. By analogy to the color photographic art, the term "color-separation image" refers to a monochrome image, usually black-and-white representing a primary color. Such an image may be that of the complete object field to be reproduced, or only a portion thereof.

For proper operation it is necessary that the rotating filter element be in synchronism and correct phase with the transmitting or receiving scanning device employed. Referring to the receiver for convenience, it is necessary not only for the filter element to rotate in synchronism with the reproduction of successive color-separation images, but also that it be phased with respect to the images so that, say, the red color-separation image will be displayed through the red filter, the green color-separation image through the green filter, etc. This may be termed "color phasing" and is a relatively coarse adjustment. For example, with a disk having six filter segments a chaneg in phase of 60° or multiples thereof suffices for color phasing.

An additional requirement is that the filter segments be properly phased with respect to the line-by-line reproduction of corresponding images, so that as successive lines are reproduced they will be exhibited through the proper color filter. If there is any afterglow or storage effect in the image reproduction, the filter segments must be sufficiently wide and properly phased so that correct color rendition is obtained. This may be termed "color field phasing" of the disk and is a relatively fine adjustment.

Patents Nos. 2,329,194 and 2,323,905, to Goldmark, disclose various methods and apparatus for synchronizing and phasing a rotating color filter with respect to a scanning device. Patent No. 2,319,789 to Chambers discloses a similar system in which the color phasing is performed automatically.

In Patent No. 2,323,905 the color filter is driven somewhat over synchronous speed by a non-synchronous motor. A local control wave is generated by the rotation of the filter and its phase compared with that of an incoming synchronizing signal in a phase-comparing circuit. The output of the phase-comparing circuit is supplied to a brake to control the speed of rotation of the filter so as to maintain it in proper synchronism. Other patents have disclosed different means for utilizing a difference in phase between a locally generated wave and an incoming synchronizing wave to effect synchronization.

In these various systems color field phasing of the rotating filter has been accomplished by mechanically adjusting the position of the filter element on its shaft, or by adjusting the position of the stator of the local generator, or by other mechanical means. Patent No. 2,437,690 issued to Peter C. Goldmark discloses means for performing this color field phasing by a variable electrical circuit.

In these prior systems the non-synchronous motor is commonly energized directly from the power mains so as to avoid generating large amounts of power electronically. Power line voltages vary from area to area, and often fluctuate considerably even at a given location. Thus if a brake is employed, it must be capable of absorbing a large percentage of the available motor power in order to maintain synchronization at the higher line voltages. In my prior application Serial No. 102,232, filed June 30, 1949, I have described synchronizing apparatus employing a saturable core reactor to control the speed of the non-synchronous motor.

While the brake, saturable core reactor, or other means provided for synchronization may be designed to take care of voltage variations and fluctuations to preserve synchronization, it is clear that the color field phase of the rotating filter with respect to the color-separation images must necessarily change. This is due to the fact that the reproduction of the color-separation images is in synchronism and definite phase with the incoming synchronizing signal, so that the change in phase of the local control signal with respect to the synchronizing signal required to provide proper operating current to the brake or other means results in a shift in phase between the filter element and the images. This may result in improper reproduction of colors over part of the image area, or may make either the lagging or leading edge of a given color filter segment visible to the observer.

Variations in temperature are also found to have a considerable effect on the color field phase. In particular, temperature effects and perhaps other effects appear to cause the driving motor to produce different torques for the same applied voltage under conditions otherwise appearing to be the same. Thus, a synchronizing system which functions satisfactorily for varying line voltages may still be unsatisfactory from day to day due to temperature effects.

In some systems previously described the synchronizing signal portions used for controlling the rotation of the filter element are at field scanning frequency and special means are required for color phasing. It has also been proposed to utilize distinctive color synchronizing portions recurring at the frequency of a given color to control rotation of the filter element. The latter proposal avoids the need of additional means for color phasing, but yields a lower synchronizing frequency and hence increases the difficulty of proper color field phasing.

In my prior application, above identified, I have described a system for maintaining proper color field phasing between the rotating element and the scanning device which maintains the phase within very narrow limits despite wide variations in line voltage and in temperature. The present invention provides apparatus for maintaining the color field phase within very narrow limits which is somewhat less expensive to build under certain circumstances.

Further advantageous features are provided in accordance with the present invention. In most, if not all, systems of this general character, stable operating regions alternate with unstable regions. In the stable regions the change in phase of the local and incoming synchronizing signals causes a change in the motor speed in the direction tending to oppose the change in phase. Thus if the motor is running slightly under speed, the lag of the locally-generated signal with respect to the incoming synchronizing signals produces an increased torque which tends to speed up the motor. On the other hand, in the unstable regions a change in phase changes the motor speed in a direction tending to increase the change. That is, if the motor is slightly under speed, the change in phase will tend to cause the motor to slow down still more. With proper design, when the motor speed is near synchronous speed, the torque produced during the stable operating regions is sufficient to pull the motor into precise synchronization and hold it there.

When the receiver is initially started, and sometimes when the receiver is switched from one station to another, there is an interval during which the motor speed differs considerably from synchronous speed. Under such conditions, the relative phase of local and incoming synchronizing signals passes rapidly through stable and unstable operating regions. The net effect is to tend to average the effect of the speed control circuit until the motor speed is sufficiently close to synchronous speed so that it will pull in during one of the stable operating regions.

The present invention provides means for reducing the time required for the motor to pull into proper synchronization under such conditions.

Accordingly it is a primary object of the present invention to provide means for synchronizing a color filter element and for maintaining a precise phase relationship between the filter element and the field scanning despite considerable variations in line voltage, temperature and synchronizing signal input. It is a further object to provide such a system which is relatively inexpensive to build and simple and reliable in operation. An additional object is to provide a system in which the color filter element is pulled rapidly into synchronization after a period of non-synchronous operation.

In the apparatus of the present invention one of the synchronizing and locally-generated signals, as applied to the phase-comparing circuit, comprises relatively short periodic pulses and the other has relatively longer periodic slope portions in one direction in the stable operating regions. The slope portions are advantageously made very steep so that only small changes in phase between the pulses and the slope portions will produce a large change in motor torque. Therefore only small changes in color field phase suffice for full control of the motor speed so that the phase of the color filter element with respect to the reproduced pictures is maintained within very close tolerances. It is possible to locally generate the short periodic pulses and utilize the synchronizing signal pulses to generate the other wave having periodic slope portions. However, it is more convenient to utilize the synchronizing signal pulses as such (or with suitable reshaping and amplification) and design the local generator to give the wave having slope portions.

It is possible to use a locally-generated sine wave, and this is described hereinafter in connection with one of the specific embodiments. However, in order to secure a sufficiently steep slope, particularly when the frequency is that of fields of one color (commonly one-third the field frequency) the sine wave must be of very large amplitude. The required large amplitude may interfere with the proper operation of the phase-comparing circuit and also may be expensive to generate. Therefore several different forms of local signals are provided herein which have the desired steep slopes without excessive amplitudes, and which have other advantageous operating characteristics.

To facilitate pulling into synchronization, a gating circuit is provided which substantially prevents change in the motor control wave during the intervals between stable operating regions. The control wave at the end of each stable operating region has a value tending to effect synchronization, and the gating circuit insures that this value will remain effective until the next operating region is reached. In this manner acceleration or deceleration of the disk under asynchronous conditions is hastened so that synchronous operation is more rapidly attained. A further advantageous feature of the gating circuit is that the range of voltage, temperature conditions, etc. over which the motor can be pulled into synchronization approaches or equals the range over which synchronization can be maintained once it has been attained. In effect, the gating circuit adds speed discrimination to the phase discrimination, and this combination results in rapid synchronization and precise maintenance of phase under highly adverse conditions.

The invention will be more fully understood by reference to the specific embodiments illustrated in the drawings and the following description thereof. In the drawings.

Figures 1, 2, 3:
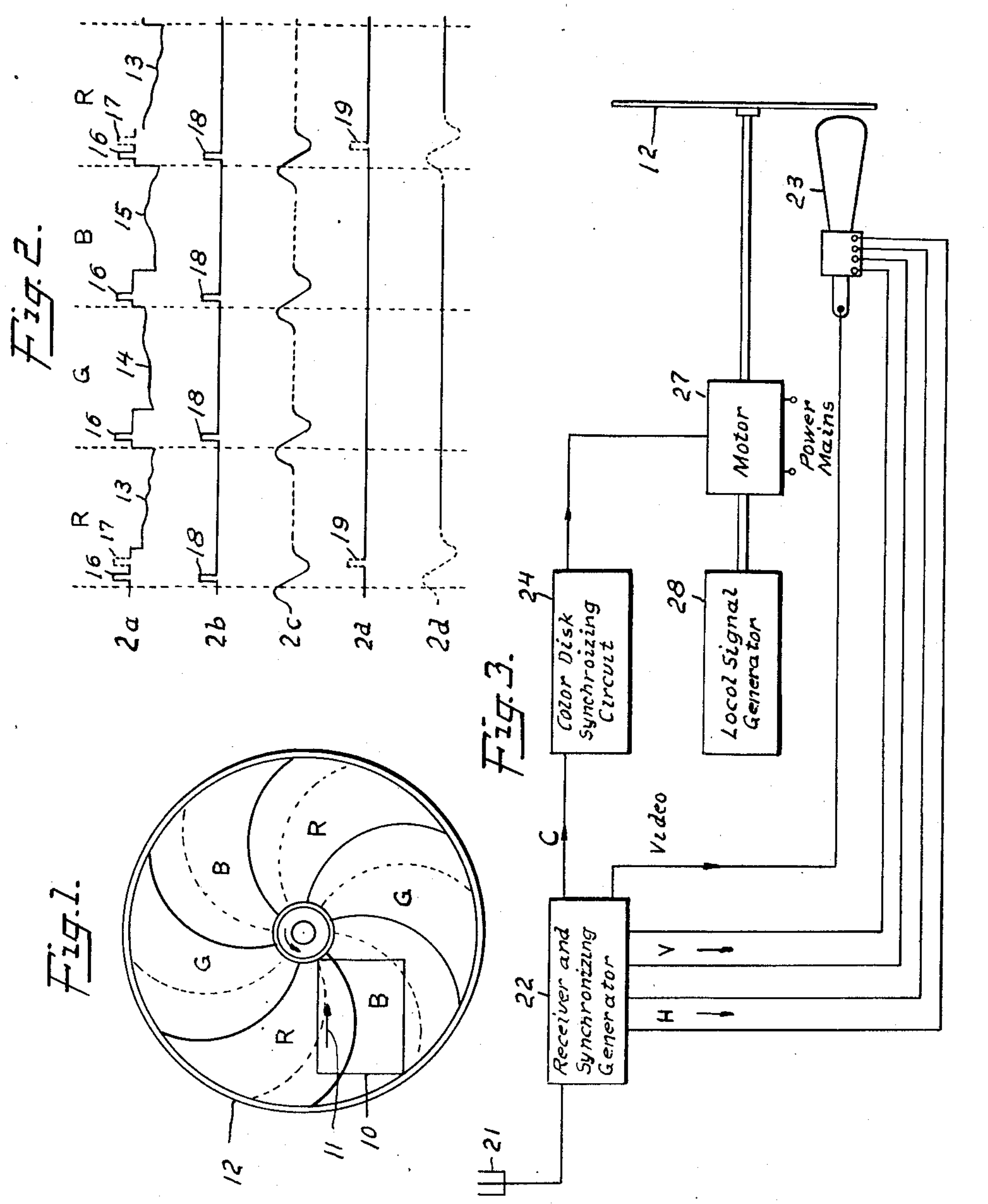
Fig. 1 illustrates proper and improper color field phasing.
Fig. 2 represents a sequential color video signal and additional wave forms to illustrate the operation of the specific embodiments.
Fig. 3 is a block diagram illustrating the general arrangement of the apparatus.

Referring now to Fig. 1, the rectangle 10 represents the reproducing area of a receiver, such as the screen of a cathode-ray tube. Arrow 11 indicates the line being scanned at the instant illustrated. A scanning disk 12 with filters R, G, B rotates in front of the scanning area so as to exhibit successive color separation images reproduced on the scanning area in their corresponding colors. The segments of filter disk 12 have the configuration described in Patent 2,304,081 to Goldmark. The field scanning is assumed to proceed from top to bottom, and the disk to rotate counterclockwise. It will be understood that a filter drum or other form of filter element may be employed instead of the disk shown.

In the position shown in full lines it will be observed that the red filter is phased slightly in advance of line 11 being scanned, and line 11 will be understood to correspond to the red aspect of the image to be reproduced. As scanning proceeds toward the bottom, the red filter will maintain its position slightly in advance so that the lines will be exhibited in the proper color as they are scanned, over the entire image area 10. When the green color-separation image begins to be reproduced by scanning line 11, the green filter segment will be in proper position to exhibit the line therethrough. Thus proper color field phasing is attained.

While considerable latitude in phasing is available by the design of disk 12, the dotted position shows the disk lagging sufficiently to result in an improper color field phase relationship. If scanning line 11 is again assumed to represent a red aspect of the image, it will be observed that a portion of the line is being exhibited through the blue filter, since the red filter is lagging too far behind its proper position. Hence a mixture of blue and red colors will be obtained from line 11, assuming that some afterglow is present. Under stable conditions, this situation may be corrected by rotating filter disk 12 on its axis through the necessary angle, or by other means. However, under changing conditions the disk may sometimes be in correct and sometimes in incorrect color field phase, so that this expedient is insufficient.

If there is considerable variation in the color field phase under various conditions of operation, the color filter disk must be made sufficiently large to provide the necessary margin of safety. On the other hand, if sufficiently small deviation in color field phase is maintained, a much smaller color filter disk is possible without danger of incorrect reproduction of color. This is very important in order to keep the size of the receiver cabinet as small as possible and to minimize the amount of power required to drive the disk.

Referring now to Fig. 2, a color video signal of the sequential type is shown, having successive portions 13, 14 and 15 representing different color aspects or color-separation values of the object field, denoted R (red), G (green), B (blue). Successive portions are assumed to represent successive field scansions which may be interlaced as mentioned hereinbefore. The video signal also has a synchronizing signal associated therewith in fixed time relationship. This signal includes pulses 16 provided for field synchronization. These are shown as single pulses for convenience, but are ordinarily groups of pulses and may be of any desired form known in the art. While the field synchronizing pulses 16 may be used alone for color synchronization, Fig. 2 shows in dotted outline additional distinctive pulses 17 accompanying each red color field which may be used by themselves for color synchronization, or may be used in conjunction with the field synchronizing pulses 16 for color synchronization. Again, color pulses 17 are shown as single pulses for convenience, but may be groups of pulses capable of convenient separation. The line synchronizing pulses of the synchronizing signal are not shown in Fig. 2 since it is impracticable.

Pulses 18 (Fig. 2b) are derived in any desired manner from the field synchronizing pulses 16. The duration of the pulses may vary over fairly wide limits, but are advantageously short compared to the field period. Also, the phase between the derived field synchronizing pulses 18 and the initial pulses 16 may be different from that illustrated, but should be fixed.

In Fig. 2d pulses 19 are shown which are derived in any desired manner from the color synchronizing pulses 17, and recur at the frequency of fields of one color, here shown as red. Like the field synchronizing pulses 18, pulses 19 are advantageously short compared to a field period and their phase with respect to pulses 17 should be fixed, although it may be different from that shown.

Figure 4:
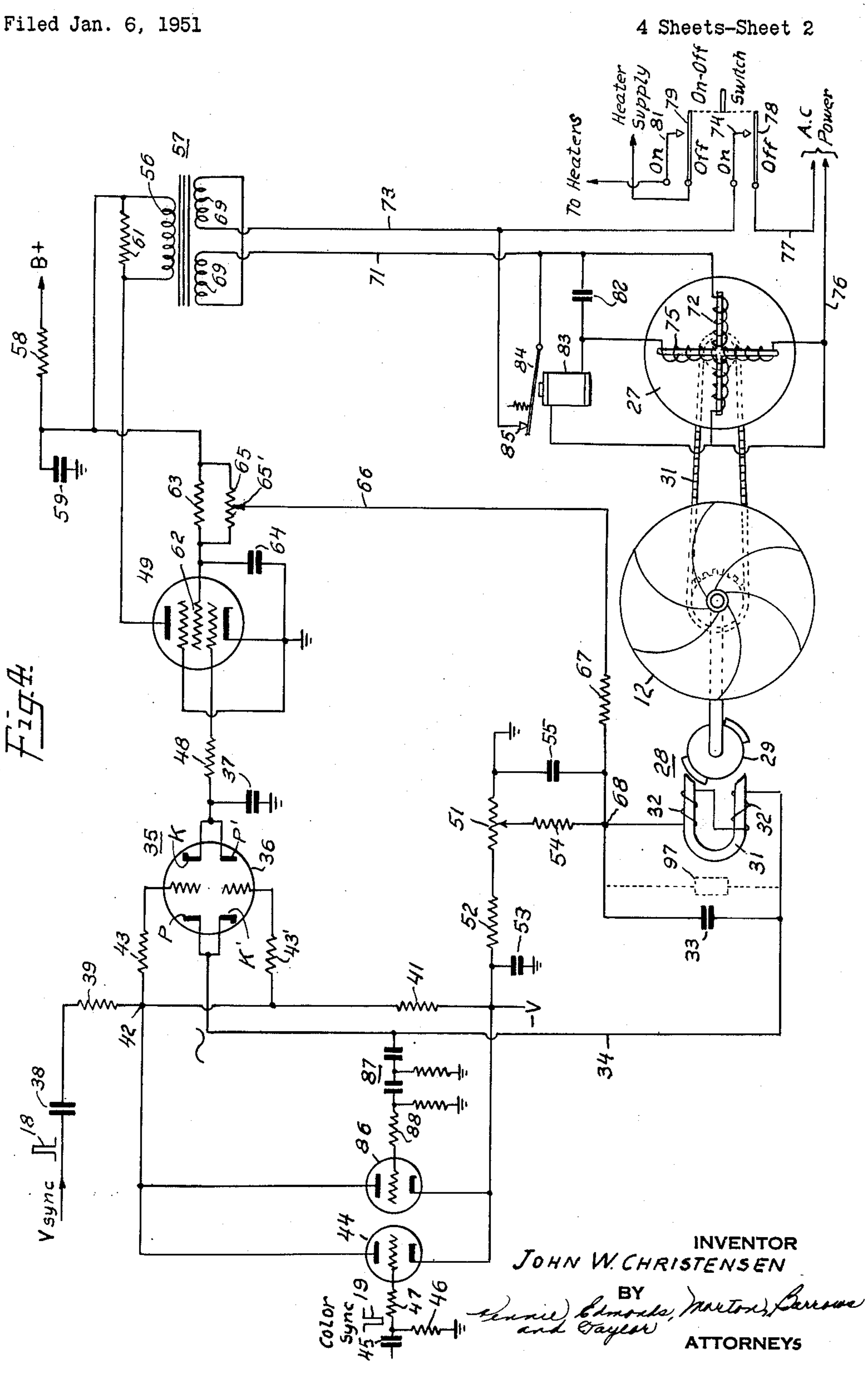
Fig. 4 is a circuit diagram of one embodiment of the invention utilizing a sinusoidal locally-generated wave.
Figure 5:
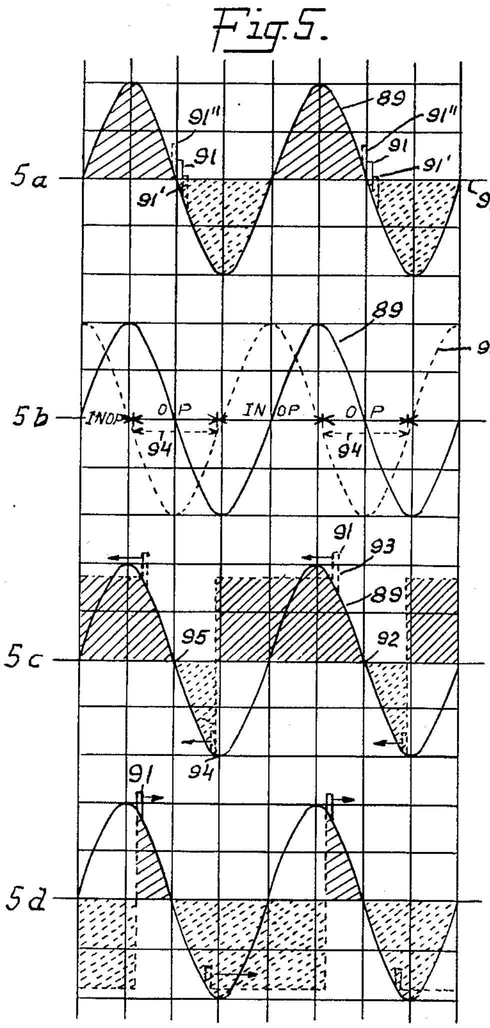
Fig. 5 is a diagram illustrating the operation of the gating circuit of Fig. 4.
Figures 7, 8, 9:
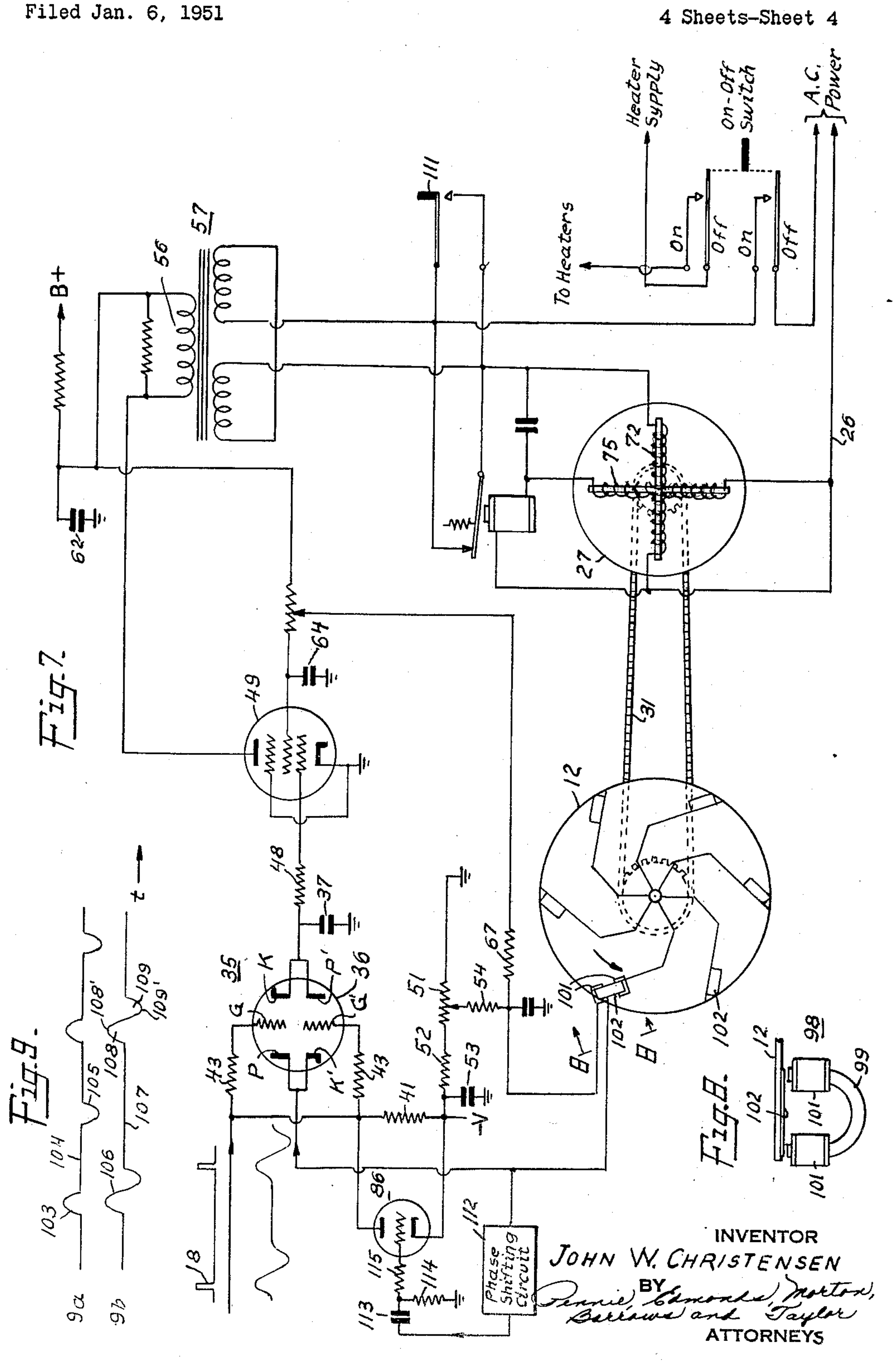
Fig. 7 is a circuit diagram of another embodiment of the invention.
Fig. 8 is a partial view showing details of the local generator of Fig. 7.
Fig. 9 shows wave forms explanatory of the design of the generator of Figs. 7 and 8.

Fig. 2c illustrates the pulses generated by the local signal generator of Fig. 7 when field synchronizing pulses are used to synchronize the color filter disk. Similarly Fig. 2e illustrates the locally-generated pulses when only the distinctive color synchronizing pulses are used to synchronize the disk. The locally-generated sine wave used in Fig. 4 is shown in Fig. 5 referred to hereinafter.

Referring now to Fig. 3, a color video signal of the sequential type having a synchronizing signal therewith, like that of Fig. 2 or any other suitable type, is received by antenna 21 and supplied to the receiver and synchronizing generator 22. In 22 the incoming signal is amplified and detected, and the video supplied to the control grid of cathode-ray tube 23. The line and field synchronizing pulses are employed to control the generation of horizontal (H) and vertical (V) sawtooth scanning waves which are supplied to the deflecting coils or plates of the cathode-ray tube. Thus the reproduction of the color-separation images will be in synchronism nad bear a definite phase relationship with the synchronizing signal.

Either the field synchronizing pulses 18, or the distinctive color synchronizing pulses 19, or both, may be supplied from 22 to the color disk synchronizing circuit 24, and the specific circuits described hereinafter give examples.

Color filter disk 12 is driven by non-synchronous motor 27 energized from a suitable source of power here shown as the power mains. A generator 28 is driven synchronously with the color filter disk and generates a local signal wave whose frequency varies with the speed of rotation of the color filter disk 12 and is equal to that of the synchronizing signal (field or color, as selected) when the disk is rotating at synchronous speed. Electromagnetic generators are preferred and are shown in the specific embodiments, but other forms of generators may be used if desired. The output of generator 28 is supplied to disk synchronizing circuit 24. In 24 the phases of the synchronizing and local signals are compared and a control wave derived which varies with change of phase. This control wave is used to control the speed of motor 27.

Referring now to Fig. 4, a non-synchronous motor 27 drives color filter disk 12 through a belt drive 31 providing proper speed ratios. Local generator 28 is driven simultaneously with disk 12, and the rotor 29 is preferably mounted on the same shaft. In this embodiment the generator is designed to produce a substantially sinuosoidal wave having the frequency of fields of one color at synchronism. For example, with two sets of three color filters and 144 fields per second, the frequency is 48 cycles per second. Stator 31 has coils 32 wound thereon to provide an output sine wave. Details of such generators are well known in the art and need not be described further. If desirable or necessary, a capacitor 33 may be shunted across the stator coils 32 and tuned with the latter to make the generated wave more nearly sinusoidal. The local signal is supplied through lead 34 to the phase-comparing circuit, generally designated 35.

The phase-comparing circuit 35 is here shown as including tube 36 having two triode sections. Separate tubes can of course be employed if desired. The anode P of one triode section is connected to the cathode K′ of the other, forming an input circuit to which the local signal is supplied through lead 34. The cathode K of the first section is connected to the anode P′ of the second section, forming an output circuit across which storage capacitor 37 is shunted.

The grids G, G′ are supplied with field synchronizing pluses 18 through coupling capacitor 38 and series resistor 39. A coupling impedance here shown as resistor 41 is connected between the common point 42 to which the sync pulses are supplied and a suitable source of negative bias denoted −V. High resistors 43 and 43′ are placed in series with respective grids G, G′ to insure that the grids will not go substantially positive with respect to their corresponding cathodes. Without this precaution the grids might be driven so positive as to become anodes, in effect, and interfere with the phase-comparing operation.

As the circuit has been described thus far, it will be apparent that normally grids G, G′ will be sufficiently negative to their respective cathodes, because of the bias −V, so that current is cut off in both sections of the phase-comparing tube. When a vertical sync pulse 18 arrives, the grids are driven in the positive direction so that current can flow in either direction through tube 36 depending upon the then-existing relative potentials of the locally-generated sine wave and the potential on capacitor 37. Consequently the potential on storage capacitor 37 will assume the then-existing instantaneous potential of the applied local signal.

In this embodiment it is desired to use color synchronizing pulses for synchronizing the disk, that is, synchronizing pulses recurring at the frequency of one primary color, so that proper color phasing is automatically obtained. On the other hand, it is desirable to have pulses of large amplitude applied to the phase-comparing circuit, advantageously of the order of 100 to 200 volts, in order to insure precise operation of the circuit. A convenient source of large amplitude pulses exists in an ordinary receiver in the vertical sawtooth generating circuit employed to deflect the beam of the cathode-ray tube. These synchronizing pulses are of field frequency, however, and hence are three times the frequency of the color pulses. It would be possible to amplify the color sync pulses 19 (Fig. 2), but to avoid such amplification the present embodiment uses the color sync pulses to control the application of the field sync pulses to the phase-comparing circuit so that only every third field pulse is effective.

To this end tube 44 is provided having its cathode-anode circuit shunting coupling resistor 41. Color synchronizing pulses 19 are derived from the color television signal in any desired manner and have a duration somewhat greater than the vertical synchronizing pulses 18. Pulses 19 are applied to the grid of tube 44 through coupling capacitor 45, input resistor 46, and a small series resistor 47 to suppress parasitic oscillations. The cathode of tube 44 is held at a negative potential (−V) whereas the grid is grounded through resistors 46, 47. Consequently, in the absence of an applied signal the grid draws current and its potential is slightly above the cathode.

A high plate current passes through tube 44, thus creating a path of low resistance between point 42 and —V. This substantially short-circuits resistor 41 so that any vertical synchronizing pulses arriving are short-circuited around resistor 41 and hence have no effect on the phase-comparing circuit. However, when a negative color synchronizing pulse 19 arrives, tube 44 is cut off. This removes the short circuit across resistor 41 so that every third vertical sync pulse 18, which are in time phase with color sync pulses 19, are applied to the grids G, G′ of the phase-comparing tube 36.

From another point of view, resistor 39 forms a voltage divider circuit with the resistance from point 43 to —V. When tube 44 is cut off, the resistance of 41 is sufficiently high compared to 39 to apply synchronizing pulses 18 of ample amplitude to the phase-comparing circuit 35. However, when tube 44 passes current, its impedance is sufficiently low compared to 39 so that the amplitude of pulses 18 as applied to circuit 35 are too small to be effective.

It will be understood that this circuitry represents a simple means for supplying pulses of color sync frequency and of large amplitude to the phase-comparing tube 36. If desired, other suitable forms of circuitry may be employed.

The voltage across storage capacitor 37 varies with the relative phase of the locally-generated sine wave and every third synchronizing pulse, and is the motor control wave. This wave is supplied through series resistor 48 to the control grid of the motor control tube 49. The cathode and suppressor grid of tube 49 are here shown as grounded. The normal operating bias for tube 49 can be adjusted by potentiometer 51 in the local generator. To this end, potentiometer 51 and resistor 52 are placed in series between —V and ground, to form a voltage divider circuit. Filter capacitor 53 is advantageously connected in shunt with —V. One end of coils 32 on the local generator is connected to the slider of potentiometer 51 through resistor 54, and shunting capacitor 55 is provided for filtering.

The voltage across storage capacitor 37 hence has a D.-C. component determined by the setting of potentiometer 51 and this D.-C. component is applied to the grid of tube 49 so that the operating point of tube 49 may be selected as desired. The A.-C. component of the voltage on capacitor 37 varies with the relative phase of the local and incoming synchronizing pulses as explained before, and also is applied to the control grid of tube 49 to regulate the speed of motor 27.

The primary 56 of the saturable core reactor 57 is connected between the anode of motor control tube 49 and a suitable source of voltage denoted B+ and a decoupling resistor 58 and filter capacitor 59 are provided. Resistor 61 is advantageously shunted across the primary 56 to prevent injury due to high voltage surges when tube 49 is cut off. The value of resistor 61 is advantageously selected so that the time constant of discharge when tube 49 is cut off is approximately equal to the charging time constant when the tube is on.

The screen grid 62 of tube 49 is supplied with suitable potential from the B+ source and is shunted to ground by capacitor 64. A potentiometer 65 is shunted across resistor 63 and the voltage at the slider 65′ is used to provide an anti-hunt voltage as described in my copending application Ser. No. 102,232 referred to above. If desired, the resistor 63 may be eliminated and a suitable value of potentiometer resistance selected. The arrangement shown has somewhat greater flexibility.

The anti-hunt voltage is fed back thru lead 66 and resistor 67 to point 68 in the local generator circuit. Capacitor 55 is advantageously selected so that its impedance at the relatively low hunting frequencies is sufficiently high to avoid excessive shunting of the anti-hunt voltage to ground. Consequently the anti-hunt voltage is superposed on the locally-generated signal supplied to the phase-comparing circuit and serves to prevent hunting of the apparatus. Resistor 67, together with resistor 54 and the portion of potentiometer 51 toward ground form a voltage divider circuit so that only a portion of the anti-hunt voltage from potentiometer 65 is fed back. Resistor 67 is sufficiently large so that the B+ voltage does not overcome the negative bias supplied to the generator circuit by the —V source. Potentiometer 65 provides an adjustment for the amount of anti-hunt voltage fed back, but it will be understood that in practice the desired amount of anti-hunt voltage may be predetermined and supplied by fixed voltage divider resistors.

The secondary windings 69 of the saturable core reactor are connected in series and one lead 71 is connected directly to winding 72 of motor 27. The other lead 73 is connected to contact 74 of the on-off switch.

Motor 27 is here shown as of the split phase capacitor type having stator windings 72 and 75. One end of each motor winding is connected through lead 76 to a source of A.-C. power, here assumed to be 60 cycles. The other lead 77 from the power source is connected to armature 78 of the on-off switch. A suitable source of heater supply for the tubes is connected to armature 79 of the switch, the two armatures being ganged together for simultaneous operation. Contact 81 is connected to the heaters of the tubes.

A capacitor 82 is connected between lead 71 and winding 75, and a starting relay 83 is connected across winding 75. The relay armature 84 is connected to lead 71, and the relay contact 85 is connected to lead 73.

Returning to the phase-comparing circuit, a gating circuit is provided including tube 86 having its anode-cathode circuit shunting coupling resistor 41, and its grid circuit supplied with the locally-generated sine wave through an R-C phase-shifting circuit generally designated as 87. A series grid resistor 88 is employed for isolation purposes and to insure that the grid does not go substantially positive with respect to the cathode. The functioning of this gating circuit will be described more fully hereinafter in connection with Fig. 5.

The overall operation of the circuit of Fig. 4 will now be described. The on-off switch is moved to the "on" position, thus energizing the motor and the heater supply. In starting, the impedance of relay 83 is large compared to the effective impedance of winding 75, so that the relay remains in open position. Armature 84 therefore engages contact 85 to short-circuit the saturable core reactor. Thus, until the motor comes up to speed, the motor control circuit is short-circuited and full voltage is applied to the motor.

As the motor speeds up, the effective impedance of winding 75 increases until a point is reached when sufficient current flows through relay 83 to actuate the relay and open the circuit between armature 84 and contact 85. When this condition has been reached, the motor control circuit assumes control to bring the motor into synchronism and proper phase with respect to the reproduced pictures.

Instead of the relay arrangement illustrated, it is also possible to employ a motor having a centrifugal switch. The switch may be used to cut out a starting winding when the motor has been brought up to speed, as shown in my copending application referred to above, or it may be connected to short-circuit the reactor until sufficient speed has been attained, or both. Other alternatives are possible as will be understood by those in the art.

Turning now to the operation of the motor speed control circuit, the grids of the phase-comparing tube 36 are normally biased sufficiently negative so that no current flows in either section. When a field synchronizing pulse 18 arrives in coincidence with a color synchronizing pulse 19, the grids of tube 36 are driven in a positive direction and capacitor 37 assumes the then-existing potential of the locally-generated wave.

To understand more clearly the operation of the phase-comparing circuit, and particularly the gating circuit, reference may be made to Fig. 5. For convenience of explanation, it will first be assumed that the filter disk is being driven in synchronism with the field scanning and in proper color field phase therewith. In Fig. 5*a* the locally-generated sine wave is denoted 89, and is of color synchronizing frequency. Synchronizing pulses 91 represent each third field synchronizing pulse 18 occurring in time phase with color synchronizing pulses 19. As shown, pulses 91 lie on approximately the middle of the downwardly-extending slopes of the sine wave. Line 92 represents the A.-C. axis of the wave and corresponds to the D.-C. bias applied to the control grid of tube 49. The value of this D.-C. bias is determined by the setting of potentiometer 51. It is advantageously selected so that the resulting current through tube 49 and the saturable core reactor will maintain synchronous operation under selected "normal" operating conditions. Such "normal" operating conditions will ordinarily be selected midway between the extremes of voltage and temperature conditions under which the apparatus is intended to operate.

If then, there is a tendency for the motor to speed up, due to a rise in power line voltage for example, pulses 91 will come along later with respect to the sine wave and hence fall to positions 91′ on the slopes. The voltage on capacitor 37 will fall, tube 49 will pass less current, the inductive reactance of the reactor will increase, and the motor voltage will decrease. Consequently the motor will slow down. On the other hand, if the motor speed is too low, sync pulses 91 will arrive earlier and hence rise to positions 91″ on the slopes, thus increasing the voltage across capacitor 37 and increasing the motor speed.

In order to maintain color field phasing within close tolerances, tube 49 and the associated motor control circuits are selected so that only a few volts change at the grid will give full control of the motor speed. The amplitude of the sine wave is then made sufficiently large to give a very steep slope at the zero axis 92, so that only a slight displacement of the synchronizing pulses along the slope will yield the voltage necessary for full control of the motor speed. In one apparatus which has been operated successfully, a change in grid voltage of tube 49 of about six volts is sufficient to change the motor speed from minimum to maximum, and the slope of the local signal is such that the required six volts can be obtained with only two degrees changes in phase. Hence the phase of the rotating filter disc with respect to the field scansions will not vary more than two degrees despite wide variations in power line voltage and temperature conditions.

It will be understood from the above description that the downwardly-extending slopes of wave 89 are stable operating regions which will effect and maintain synchronization. When the motor speed tends to change, the effect of the phase-comparing and motor control circuits is in the direction to oppose the change. Slopes in the opposite direction, the upwardly-extending slopes, are unstable regions since, when the motor speed tends to change, the effect of the circuits is to augment the change. Of course, if the motor control circuit were altered so that a change in voltage at the grid of tube 49 in the positive direction caused the motor to slow down, the upwardly-extending slopes would become the stable regions and the downward slopes unstable. Proper correlation to insure stable operation on slopes of predetermined direction will be clear to those skilled in the art.

If the motor speed differs considerably from synchronous speed, as in starting or occasionally in switching from one station to another, the sync pulses 91 and local signal 89 will drift rapidly with respect to each other and the net effect would be approximately equal increases and decreases of potential on capacitor 37 over a period of time. Thus the effect of the motor control circuit would be approximately that due to the D.-C. bias on tube 49, determined by the setting of potentiometer 51. Therefore, it is necessary that the motor be sufficiently powerful, with respect to the inertia of the rotating components, so that it can be pulled into synchronism in a period of time represented by one downward slope of the sine wave. Because of this, the range of voltages and temperature over which a motor can be pulled into synchronization will ordinarily be considerably less than the range over which the motor can be held in synchronization once synchronization has been achieved. It is highly desirable to increase the range over which the motor can be pulled into synchronization and to decrease the size of motor required for a given installation.

Furthermore, it is desirable to hasten acceleration and deceleration of the motor when it is considerably away from synchronous speed. The setting of the biasing potentiometer 51 may be altered so as to hasten acceleration at the expense of slower deceleration, or vice versa. That is, if the bias is adjusted so that the pulses 91 lie further up on the slopes under normal operating conditions, the average potential of the grid of tube 49 will be more positive under nonsynchronous conditions, thus hastening acceleration. However, if the motor is over speed, this change in bias will increase the time required to decelerate. A further disadvantage of such an expedient is that the range of voltages and temperatures over which the circuit will synchronize is decreased in the over speed direction. Conditions are reversed if the bias is set normally lower than that shown in Fig. 5*a*, yielding greater deceleration but slower acceleration, with accompanying decrease in the synchronizing range for under speeds.

In order to hasten both acceleration and deceleration without decreasing the effective range of synchronization in either direction, and to avoid the necessity for excessive power/inertia ratios, the present invention provides a gating circuit whose functioning will now be described.

It will be understood that whenever the synchronizing signals ride on the upper halves of the sine wave 39, the resulting voltage at tube 49 increases the motor speed. On the other hand, whenever the pulses ride on the lower halves of the sine waves, the motor speed will drop. Thus the regions cross-hatched in full lines represent accelerating regions, and those cross-hatched in dotted lines represent decelerating regions. Under asynchronous conditions, the pulses slip with respect to the sine wave and pass through accelerating and decelerating regions in rapid succession, thus averaging the effect of the motor control circuit.

By the use of the gating circuit, the average effect of the motor control circuit under asynchronous conditions is such as to establish synchronization. That is, if the motor is running too slow, the average effect of the motor control circuit is to accelerate it, and vice versa. To this end, the gating circuit is operated in synchronism with the local signal and is connected to the phase-comparing circuit so as to prevent the phase-comparing circuit from producing a change in the output control wave during the intervals between the slopes yielding stable synchronization.

The phase-shifting circuit 87 of Fig. 4 is adjusted to shift the phase of the local sine wave by approximately 90° as indicated by the dotted line 93 in Fig. 5*b*. Since wave 93 is of large amplitude, tube 86 will be cut off during most of the negative half of this wave as indicated by the dotted line 94. When tube 86 is cut off, it removes the short circuit across resistor 41 and hence the phase-comparing circuit is in operating condition. These operating regions correspond to the downward slopes of the local signal 89 and are denoted "OP." When the phase-shifted wave 93 is positive, or only slightly negative, tube 86 conducts and substantially short-circuits resistor 41, hence preventing the phase-shifting circuit from operating during the upward slopes of the sine wave which are regions of unstable operation. These inoperating regions are denoted "INOP" in Fig. 5*b*. Thus neither the local control wave nor the synchronizing pulses can have any effect on the phase-comparing circuit while gating tube 86 passes current. Thus capacitor 37 is substantially isolated and the potential on this capacitor remains at the value established by the previous operation of the circuit.

Referring now to Fig. 5*c*, it will be assumed that the motor is running under speed so that pulses 91 are travelling to the left with respect to the local wave 89. As pulse 91 travels up the slope from the midpoint 92, the voltage across capacitor 37 becomes more and more positive hence tending to accelerate the motor. At point 93 the gating tube 86 starts to conduct, thus isolating capacitor 37. The voltage across the capacitor remains at the level of point 93 until the pulse reaches point 94, at which time gating tube 86 is cut off and the then-existing negative potential of the sine wave is applied to capacitor 37. During the time interval from points 94 to 95, the motor is decelerated, but after the pulses pass point 95 it is once more accelerated. The areas denoted by solid cross-hatching in Fig. 5*c* hence represent regions of acceleration, and the much smaller areas in dotted cross-hatching represent regions of deceleration. The net effect of the motor control circuit under these conditions is to continuously accelerate the motor to synchronism. When the motor has reached synchronism, it is locked in phase in the operating regions as described in connection with Fig. 5*a*.

Fig. 5*d* illustrates the case where the motor is considerably over speed and pulses 91 are travelling to the right. In this case the intervals of deceleration (dotted cross-hatching) greatly exceed the intervals of acceleration (solid cross-hatching), so that the net tendency is to decelerate the motor until it reaches synchronous speed.

It will be apparent that the gating circuit provides speed discrimination, thus greatly decreasing the time required for the disk to pull into synchronization. Thereafter the steepness of the operating region insures that precise color field phase will be maintained. The provision of both speed and phase discrimination is therefore highly advantageous. Different forms of gating circuits will occur to those skilled in the art and may be used in place of that shown. Furthermore, the gating may be such that a smaller portion of the slopes of the sine wave are employed as operating regions.

Figure 6:
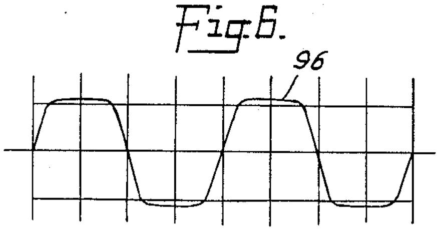
Fig. 6 is a wave form of another type of local signal which may be employed.

In order to obtain sufficiently steep slopes of the sine wave at the relatively low color synchronizing frequency, the magnitude of the locally-generated wave must be very large, of the order of 50 to 100 volts or more in many cases. The larger voltages may interfere with the proper operation of the phase-comparing circuit 35. Accordingly, it is desirable to limit the peak-to-peak amplitude of the locally-generated signal while preserving the steepness of slope. This may be accomplished, as illustrated in Fig. 6, by levelling the peaks 96 of a sine wave. In Fig. 4 this may be accomplished by inserting a nonlinear resistance 97 in shunt with the coil of generator 28. For example, resistors whose resistance decreases as current increases, such as those known as "thyrite" resistors, may be employed.

Referring now to Fig. 7, an embodiment is shown which is similar to Fig. 4 but employs a different type of local signal. Generator 98 is here shown as of the variable reluctance type. The stator structure (Fig. 8) comprises a permanent magnet 99 of horseshoe shape, having coils 101 wound thereon. Armature pieces or sections 102 are here shown mounted on the periphery of the color filter disk, but a separate rotor could be employed if desired. The armature sections are arranged on the disk in unused sections so as not to interfere with the passage of light through the filters. To this end they are advantageously arranged at an angle as shown. The stator is arranged behind the disk so that the armature sections pass over the pole pieces as shown in Fig. 8. As each armature section 102 passes over the poles of magnet 99, a cycle of voltage is induced in windings 101.

The generator is designed to produce a wave form such as that shown in Fig. 2*c*. The design principles are illustrated in Fig. 9. In accordance with well-known principles, when the leading edge of an armature section 102 begins to overlap the pole pieces, the flux in stator 99 increases and a pulse is induced in windings 101 having a shape similar to pulse 103 in Fig. 9*a*. If the armature section were sufficiently long (in the direction of movement), the pulse 103 would be followed by an interval 104 during which no change of flux would occur, and hence no induced voltage. Then as the trailing edge of the armature section passed beyond the poles, a pulse 105 of opposite polarity would be produced in the stator windings.

By suitably proportioning the length of the armature sections with respect to the dimensions of the pole pieces, the beginning of pulse 105 may be caused to coincide with the end of 103 forming a resultant single cycle 106 as shown in Fig. 9*b*. This wave form is used as the local control wave and will be seen to comprise intervals 107 of constant value alternating with cycles 106. Each cycle 106 has a positive excursion 108 and a negative excursion 109 relative to the constant value, and the duration of the slope between positive and negative peaks 108', 109' is short compared to the repetition period of the cycles. Slope durations of the order of 10–20% of the repetition period and one-third of the intervals between cycles have been employed with success.

The principles of design of generators is well understood in the art and the above explanation is sufficient to enable a suitable generator to be constructed. It will be understood that different forms of generators may be devised to give the desired wave form.

The locally-generated signal is supplied to the phase-comparing circuit 35 in the same manner as in Fig. 4. Field synchronizing pulses 18 are likewise supplied to the phase-comparing circuit in a similar manner. The output voltage of the phase-comparing circuit appears cross condenser 37, as has been explained before. This voltage varies proportionally to the difference in phase between the synchronizing pulses and the slopes between peaks 108', 109', the term "proportionally" being used broadly inasmuch as a strictly linear relationship will ordinarily not be obtained due to curvature of the signal waveform between the peaks.

In this embodiment it is assumed that the repetition frequency of the cycles 106 in the local wave is that of the field scanning and that separate means are provided for color phasing. This separate means is push button 111 which may be momentarily depressed manually to short-circuit the output of the saturable core reactor 57, so as to cause the filter disk to slip one or two segments until the field scansions are reproduced in their proper colors. Push button 111 is then released and the motor control circuit maintains precise synchronization in a manner similar to that of Fig. 4.

The regions of stable synchronization lie on the slopes between peaks 108' and 109' of Fig. 9*b*. The polarity of control of the motor control circuit is selected with respect to that of the output of the phase-comparing circuit so that when the motor is running too slow, the direction of voltage developed across capacitor 37 is in proper correlation with the tube 49 and reactor 57 to increase the motor speed. This correlation of control wave and motor control circuit will be readily apparent to those in the art and need not be discussed further.

A gating tube 86 is provided in Fig. 7 for the same purposes as described in connection with Fig. 4. The local control wave is applied through a phase-shifting circuit 112 through a coupling capacitor 113, coupling resistor 114, and series grid resistor 115 to the grid of tube 86. This shifts the phase of the local wave so that the negative peaks of the phase-shifted wave coincide with the slope portions of the local wave as applied to the phase-comparing circuit. Thus tube 86 is cut off during the slope portions and allows the phase-comparing circuit to function. On the other hand, tube 86 remains on during the intervals between the negative peaks, and consequently between the slope portions of the original signal, so that the phase-comparing circuit is disabled intermediate the slope portions and the control wave remains unchanged. Thus rapid acceleration and deceleration is obtained in the manner described in connection with Fig. 4. The phase-shifting circuit 112 is not given in detail since its design depends upon the particular shape of the locally-generated wave. The principles of design of such circuits are well understood to those in the art so that further elaboration is unnecessary.

Figure 10:
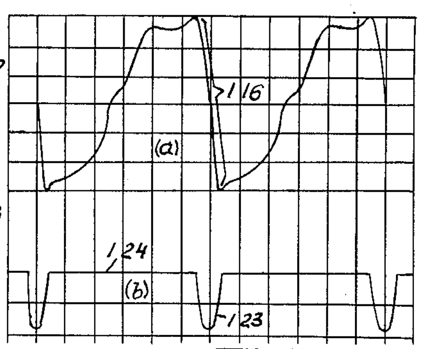
Fig. 10 shows wave forms of a further modification of the invention.

Fig. 10*a* illustrates another shape for the local signal which has considerable operational advantages. As shown, this wave comprises very steep slopes 116 in one direction, with intervening relatively gradual slopes in the opposite direction. Such a wave may be produced by the local generator shown in Figs. 11 and 12.

Figure 11:
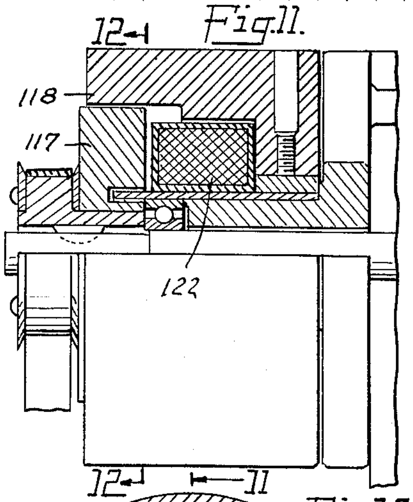
Fig. 11 is an axial cross-section of a local generator yielding the wave form of Fig. 10, taken along line 11—11 of Fig. 12.
Figure 12:
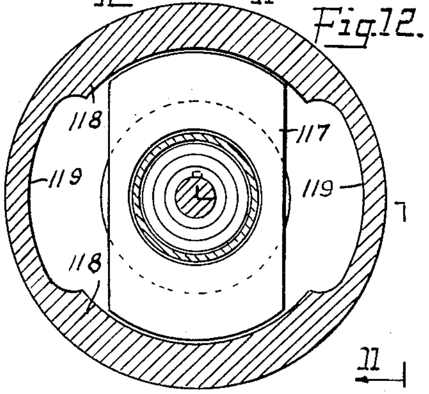
Fig. 12 is a cross-section of the generator taken along line 12—12 of Fig. 11.

Figs. 11 and 12 show a two-pole generator designed for use with a disk having six segments and utilizing pulses of color synchronizing frequency, as described in connection with Fig. 4. A rotor 117 is driven synchronously with the filter disk, and is preferably mounted on the same shaft. The stator is of magnetically permeable material such as iron and has two poles 118 with intervening air gaps 119. The magnetic circuit to the rotor is completed through the hub section 121 of magnetically permeable material. Stator coils 122 are wound around the hub portion so that a voltage is induced therein as the rotor rotates.

In this generator the rotor is permanently magnetized so that its poles are of the same sign, say south poles, and the axial portions are of the opposite sign, say north poles. It will be noted that the poles 118 are wider than the intervening gaps 119, and that the width of the rotor poles is somewhat less than that of the stator poles, and also less than the intervening air gaps 119.

With slow rotation, considerably below operating speeds, such a generator would give a wave form which rises as the rotor poles overlap the stator poles, remains constant for an interval, and then falls as the poles move out of alignment. The material and dimensioning of the stator is selected so that the magnetic circuit saturates as the rotor moves into alignment with the stator poles, thus greatly steepening the rise and fall of the voltage wave induced in coil 122.

Now, if the generator is operated at normal speed, the rise of the voltage wave as the rotor moves into alignment with the stator has a much more gradual slope than at slow speeds, due to the reluctance of the magnetic circuit. This is similar to the effect of inductance which resists change of current in an electrical circuit. However, when the rotor begins to move out of alignment with the stator poles, the fall of the voltage wave is the same as before, since the lengthening air gap prevents continuation of flux in the magnetic circuit. Thus, although the reluctance of the magnetic circuit makes the voltage rise more gradual, it cannot prevent the voltage from falling steeply. The resultant wave form is similar to that shown in Fig. 10*a*. The slight irregularities in the rising portions are not harmful inasmuch as gating is employed to confine the phase-comparing operation to the steep slope 116 of the wave.

The wave of Fig. 10*a* is applied to the phase-comparing circuit in the same manner as that shown in Fig. 4. A gating tube 86 is likewise employed as shown in Fig. 4, and an R-C circuit similar in arrangement to circuit 87 is connected between the local generator and the grid of the gating tube. In this case, the form of the wave of Fig. 10*a* permits the values of the capacitors and resistors in circuit 87 to be altered so as to differentiate the local signal. When differentiated, a wave similar to that shown in Fig. 10*b* is obtained, and comprises negative going pulses 123 corresponding to the steep slopes 116, and intervening intervals 124 of substantially constant value. There may be slight irregularities in the wave form during the intervals 124, due to the changes in slope of the rising portion of the wave of Fig. 10*a*, but these have no effect on the operation of the circuit and hence no attempt has been made to illustrate them.

It will be clear from the foregoing that the application of the wave of Fig. 10*b* to the gating tube 86 of Fig. 4 will serve to cut the tube off during the steep slope regions 116, thus allowing the phase-comparing circuit to function. However, the gating tube will pass current in between pulses 123, thus disabling the phase-comparing circuit during intervals 124. As a result, acceleration and deceleration of the disk is assisted by the motor control circuit.

The foregoing specific embodiments describe several ways of practicing the invention. It will be apparent to those skilled in the art that many modifications are possible within the spirit and scope of the invention. While synchronizing pulses and local signals having slope portions are specifically described, the two types of signals can be interchanged if desired. As has been mentioned, different forms of gating circuits may be employed, and the particular point in the circuit at which gating is introduced may be changed. The phase-comparing circuit shown is simple and reliable, but other circuits may be used as desired. Also, the motor control tube and reactor circuit is subject to many alternative forms.

I claim:

1. In a color television system employing a scanning device operating in synchronism with a synchronizing signal of predetermined periodicity, and a cooperating movable color filter element, apparatus for effecting synchronization therebetween which comprises a non-synchronous motor driving said color filter element and a generator actuated therewith to produce a local signal of periodicity varying with the filter element speed, one of said synchronizing and local signals having relatively short periodic pulses and the other having relatively longer periodic slope portions in one direction, a phase-comparing circuit supplied with said local and synchronizing signals and adapted to produce an output control wave which varies with the difference in phase between said pulses and said slope portions, speed control means supplied with said control wave for controlling the speed of said motor, and a gating circuit synchronized with the signal having said slope portions and connected to substantially prevent change in said output control wave during the intervals between said slope portions in one direction.

2. In a color television system employing a scanning device operating in synchronism with a synchronizing signal of predetermined periodicity, and a cooperating movable color filter element, apparatus for effecting synchronization therebetween which comprises a non-synchronous motor driving said color filter element and a generator actuated therewith to produce a local signal of periodicity varying with the filter element speed, one of said synchronizing and local signals having relatively short periodic pulses and the other having relatively longer periodic slope portions in one direction, a phase-comparing circuit supplied with said local and synchronizing signals and adapted to produce an output control wave which varies with the difference in phase between said pulses and said slope portions, speed control means supplied with said control wave for controlling the speed of said motor, the direction of variation of said control wave being correlated with said speed control means to normally effect synchronization with said short pulses occurring within said slope portions, and a gating circuit synchronized with the signal having said slope portions and connected to substantially prevent actuation of said phase-comparing circuit during the intervals between said slope portions, whereby change of motor speed when said pulses are intermediate said slope portions is in the direction to effect synchronization.

3. In a color television system employing a scanning device operating in synchronism with a synchronizing signal of predetermined periodicity, and a cooperating movable color filter element, apparatus for effecting synchronization therebetween which comprises a non-synchronous motor driving said color filter element and a generator actuated therewith to produce a local signal of periodicity varying with the filter element speed, one of said synchronizing and local signals having relatively short periodic pulses and the other having relatively longer periodic slope portions in one direction, a phase-comparing circuit supplied with said local and synchronizing signals and adapted to produce an output control wave which varies with the difference in phase between said pulses and said slope portions, speed control means supplied with said control wave for controlling the speed of said motor, the direction of variation of said control wave being correlated with said speed control means to normally effect synchronization with said short pulses occurring within said slope portions, and a gating circuit synchronized with the signal having said slope portions and connected to said phase-comparing circuit to substantially prevent change in the output control wave thereof during the intervals between said slope portions, whereby change of motor speed when said pulses are intermediate said slope portions is in the direction to effect synchronization.

4. In a color television system employing a scanning device operating in synchronism with a synchronizing signal of predetermined periodicity, and a cooperating movable color filter element, apparatus for effecting synchronization therebetween which comprises a non-synchronous motor driving said color filter element and a generator actuated therewith to produce a local signal of periodicity varying with the filter element speed, one of said synchronizing and local signals having relatively short periodic pulses and the other having relatively longer periodic slope portions in one direction, a phase-comparing circuit supplied with said local and synchronizing signals and adapted to produce an output control wave which varies with the difference in phase between said pulses and said slope portions, speed control means supplied with said control wave for controlling the speed of said motor, the direction of variation of said control wave being correlated with said speed control means to normally effect synchronization with said synchronizing pulses occurring within said slope portions, a gating circuit supplied with said local signal and adapted to produce gating pulses occurring during said slope portions of the local signal, said gating circuit being connected to said phase-comparing circuit to permit operation thereof during said gating pulses and substantially prevent operation thereof between gating pulses, whereby change of motor speed when said pulses are intermediate said slope portions is in the direction to effect synchronization.

5. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element and a generator actuated therewith to produce a local signal of periodicity varying with the filter element speed, said local signal having periodic slope portions in one direction, a phase-comparing circuit supplied with said synchronizing and local signals and adapted to produce an output control wave which varies with differences in phase between said synchronizing pulses and said slope portions, speed control means supplied with said control wave for controlling the speed of said motor, the direction of variation of said control wave being correlated with said speed control means to normally effect synchronization with said synchronizing pulses occurring within said slope portions, and a gating circuit synchronized by said local signal and connected to said phase-comparing circuit to substantially prevent actuation thereof during the intervals between said slope portions, whereby change of motor speed when said pulses are intermediate said slope portions is in the direction to effect synchronization.

6. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element and a generator actuated therewith to produce a local signal of periodicity varying with the filter element speed, said local signal having periodic slope portions in one direction, a phase-comparing circuit supplied with said synchronizing and local signals and adapted to produce an output control wave which varies with differences in phase between said synchronizing pulses and said slope portions, speed control means supplied with said control wave for controlling the speed of said motor, the direction of variation of said control wave being correlated with said speed control means to normally effect synchronization with said synchronizing pulses occurring within said slope portions, a gating circuit supplied with said local signal and adapted to produce gating pulses occurring during said slope portions of the local signal, said gating circuit being connected to said phase-comparing circuit to permit operation thereof during said gating pulses and substantially prevent operation thereof between gating pulses, whereby change of motor speed when said pulses are intermediate said slope portions is in the direction to effect synchronization.

7. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element and a generator actuated therewith to produce a local signal of periodicity varying with the filter element speed, said local signal having periodic slope portions in one direction, a phase-comparing circuit supplied with said synchronizing and local signals and adapted to produce an output control wave which varies with differences in phase between said synchronizing pulses and said slope portions, speed control means supplied with said control wave for controlling the speed of said motor, the direction of variation of said control wave being correlated with said speed control means to normally effect synchronization with said synchronizing pulses occurring within said slope portions, means for deriving from said local signal a gating wave having gating portions occurring during said slope portions of the local signal, and an electronic gating tube supplied with said gating wave and connected to said phase-comparing circuit to permit operation thereof during said slope portions and substantially prevent operation thereof between said slope portions, whereby change of motor speed when said pulses are intermediate said slope portions is in the direction to effect synchronization.

8. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element and a generator actuated therewith to produce a local signal of periodicity varying with the filter element speed, said local signal having periodic slope portions in one direction, a phase-comparing circuit supplied with said synchronizing and local signals and adapted to produce an output control wave which varies with differences in phase between said synchronizing pulses and said slope portions, speed control means supplied with said control wave for controlling the speed of said motor, the direction of variation of said control wave being correlated with said speed control means to normally effect synchronization with said synchronizing pulses occurring within said slope portions, a reactive circuit supplied with said local signal and adapted to derive therefrom a gating wave having peak portions occurring during said slope portions of the local signal, and an electronic gating tube supplied with said gating wave and having an output circuit connected to said phase-comparing circuit to permit operation thereof during said peak portions and substantially prevent operation thereof between said peak portions, whereby change of motor speed when said pulses are intermediate said slope portions is in the direction to effect synchronization.

9. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element and a generator actuated therewith to produce a local signal of periodicity varying with the filter element speed, said local signal having periodic slope portions in one direction, a phase-comparing circuit including a pair of grid-controlled thermionic tubes connected in parallel with the cathode of each tube connected to the anode of the other tube forming respective input and output circuits, a storage capacitor connected in said output circuit, connections supplying said local signal to said input circuit and said synchronizing signal pulses to the control grids of said tubes, whereby said capacitor assumes substantially the instantaneous voltage of the slope portions of said local signal during the simultaneous occurrence of said synchronizing signal pulses, a gating circuit supplied with said local signal and adapted to produce gating pulses occurring during said slope portions of the local signal, said gating circuit being connected to the control grids of said phase-comparing tubes to permit operation thereof during said gating pulses and substantially prevent operation thereof between gating pulses, and speed control means controlled by the voltage on said capacitor for regulating the speed of said motor, whereby change of motor speed when said pulses are intermediate said slope portions is in the direction to effect synchronization.

10. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element and a generator actuated therewith to produce a local signal of periodicity varying with the filter element speed, said local signal having periodic slope portions in one direction, a phase-comparing circuit including a pair of grid-controlled thermionic tubes having an input circuit connected to the cathode of one tube and the anode of the other tube and an output circuit connected to the anode of said one tube and cathode of said other tube, a storage capacitor connected in said output circuit, connections supplying said local signal to said input circuit and said synchronizing signal pulses to the control grids of said tubes, whereby said capacitor assumes substantially the instantaneous voltage of the slope portions of said local signal during the simultaneous occurrence of said synchronizing signal pulses, a reactive circuit supplied with said local signal and adapted to derive therefrom a gating wave having peak portions occurring during said slope portions of the local signal, and an electronic gating tube supplied with said gating wave and having an output circuit connected to said phase-comparing circuit to permit operation thereof during said peak portions and substantially prevent operation thereof between said peak portions, whereby change of motor speed when said pulses are intermediate said slope portions is in the direction to effect synchronization.

11. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element and a generator actuated therewith to produce a local signal of periodicity varying with the filter element speed, said local signal having periodic slope portions in one direction, a phase-comparing circuit including a pair of grid-controlled thermionic tubes having an input circuit connected to the cathode of one tube and the anode of the other tube and an output circuit connected to the anode of said one tube and cathode of said other tube, a storage capacitor connected in said output circuit, a connection supplying said local signal to said input circuit, a coupling impedance connected between a source of biasing potential and said grids, a connection applying said synchronizing signal pulses across said coupling impedance to periodically allow current flow in said phase-comparing circuit whereby said capacitor assumes substantially the then-existing instantaneous voltage of said local signal, speed control means controlled by the voltage on said capacitor for regulating the speed of said motor, a reactive circuit supplied with said local signal and adapted to derive therefrom a gating wave having negative peaks occurring during said slope portions of the local signal, an electronic gating tube having a cathode, control grid and anode, connections supplying said gating wave to the control grid-cathode circuit of said gating tube to render the tube substantially non-conductive during said negative peaks and conductive therebetween, and connections shunting the anode-cathode circuit of said gating tube across said coupling impedance to render substantially ineffective the synchronizing voltage appearing across said impedance while said gating tube is conductive.

12. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element and a generator actuated therewith to produce a substantially sinusoidal local signal of periodicity varying with the filter element speed, a phase-comparing circuit supplied with said synchronizing and local signals and adapted to produce an output control wave which varies with differences in phase between said signals, speed control means supplied with said control wave for controlling the speed of said motor, stable synchronizing regions corresponding to slopes in a predetermined direction of said local signal, a phase-shifting circuit supplied with said local signal for deriving a gating wave therefrom, and an electronic gating tube supplied with said gating wave and connected to said phase-comparing circuit to substantially prevent operation thereof to change said output control wave between said slopes in a predetermined direction.

13. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element and a generator actuated therewith to produce a substantially sinusoidal local signal of periodicity varying with the filter element speed, a phase-comparing circuit supplied with said synchronizing and local signals and adapted to produce an output control wave which varies with differences in phase between said signals, speed control means supplied with said control wave for controlling the speed of said motor, stable synchronizing regions corresponding to slopes in a predetermined direction of said local signal, a phase-shifting circuit supplied with said local signal for deriving a gating wave therefrom having peak portions occurring during said slopes in a predetermined direction, and an electronic gating tube circuit having an input circuit supplied with said gating wave and an output circuit connected to said phase-comparing circuit to substantially prevent operation thereof between said peak portions and permit operation during peak portions.

14. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element and a generator actuated therewith to produce a local signal of periodicity varying with the filter element speed, said local signal having periodic relatively steep slopes in one direction and intervening relatively gradual slopes in the opposite direction, a phase-comparing circuit supplied with said synchronizing and local signals and adapted to produce an output control wave which varies with differences in phase between said signals, speed control means supplied with said control wave for controlling the speed of said motor, stable synchronizing regions corresponding to said steep slopes, a differentiating circuit supplied with said local signal for deriving a gating wave having gating pulses corresponding to said steep slopes, and an electronic gating tube supplied with said gating wave and connected to said phase-comparing circuit to substantially prevent operation thereof to change said output control wave in the intervals between said gating pulses.

15. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element and a generator actuated therewith to produce a local signal of periodicity varying with the filter element speed, said local signal having periodic relatively steep slopes in one direction and intervening relatively gradual slopes in the opposite direction, a phase-comparing circuit including a pair of grid-controlled thermionic tubes having an input circuit connected to the cathode of one tube and the anode of the other tube and an output circuit connected to the anode of said one tube and cathode of said other tube, connections supplying said local signal to said input circuit and said synchronizing signal pulses to the control grids of said tubes, speed control means supplied from said output circuit for controlling the speed of said motor, stable synchronizing regions corresponding to said steep slopes, a differentiating circuit supplied with said local signal for deriving a gating wave having gating pulses corresponding to said steep slopes, and an electronic gating tube having an input circuit supplied with said gating wave and an output circuit connected to the grids of the tubes in said phase-comparing circuit to substantially prevent operation thereof between said gating pulses and permit operation during gating pulses.

16. Apparatus for synchronizing a non-synchronous motor with a synchronizing signal of predetermined periodicity which comprises a generator actuated with said motor to produce a local signal of periodicity varying with the motor speed, one of said synchronizing and local signals having relatively short periodic pulses and the other having relatively longer periodic slope portions in one direction, a phase-comparing circuit supplied with said local and synchronizing signals and adapted to produce an output control wave which varies with the difference in phase between said pulses and said slope portions, speed control means supplied with said control wave for controlling the speed of said motor, and a gating circuit synchronized with the signal having said slope portions and connected to substantially prevent change in said output control wave during the intervals between said slope portions in one direction.

17. Apparatus for synchronizing a non-synchronous motor with a synchronizing signal of predetermined periodicity which comprises a generator actuated with said motor to produce a local signal of periodicity varying with the motor speed, one of said synchronizing and local signals having relatively short periodic pulses and the other having relatively longer periodic slope portions in one direction, a phase-comparing circuit supplied with said local and synchronizing signals and adapted to produce an output control wave which varies with the difference in phase between said pulses and said slope portions, speed control means supplied with said control wave for controlling the speed of said motor, the direction of variation of said control wave being correlated with said speed control means to normally effect synchronization with said short pulses occurring within said slope portions, and a gating circuit synchronized with the signal having said slope portions and connected to said phase-comparing circuit to substantially prevent change in the output control wave thereof during the intervals between said slope portions, whereby change of motor speed when said pulses are intermediate said slope portions is in the direction to effect synchronization.

18. Apparatus for synchronizing a non-synchronous motor with a synchronizing signal of predetermined periodicity which comprises a generator actuated with said motor to produce a local signal of periodicity varying with the motor speed, said local signal having periodic slope portions in one direction, a phase-comparing circuit supplied with said synchronizing and local signals and adapted to produce an output control wave which varies with differences in phase between said synchronizing pulses and said slope portions, speed control means supplied with said control wave for controlling the speed of said motor, the direction of variation of said control wave being correlated with said speed control means to normally effect synchronization with said synchronizing pulses occurring within said slope portions, a gating circuit supplied with said local signal and adapted to produce gating pulses occurring during said slope portions of the local signal, said gating circuit being connected to said phase-comparing circuit to permit operation thereof during said gating pulses and substantially prevent operation thereof between gating pulses, whereby change of motor speed when said pulses are intermediate said slope portions is in the direction to effect synchronization.

19. Apparatus for synchronizing a non-synchronous motor with a synchronizing signal of predetermined periodicity which comprises a generator actuated with said motor to produce a local signal of periodicity varying with the motor speed, said local signal having periodic slope portions in one direction, a phase-comparing circuit including a pair of grid-controlled thermionic tubes having an input circuit connected to the cathode of one tube and the anode of the other tube and an output circuit connected to the anode of said one tube and cathode of said other tube, a storage capacitor connected in said output circuit, connections supplying said local signal to said input circuit and said synchronizing signal pulses to the control grids of said tubes, whereby said capacitor assumes substantially the instantaneous voltage of the slope portions of said local signal during the simultaneous occurrence of said synchronizing signal pulses, a reactive circuit supplied with said local signal and adapted to derive therefrom a gating wave having peak portions occurring during said slope portions of the local signal, and an electronic gating tube supplied with said gating wave and having an output circuit connected to said phase-comparing circuit to permit operation thereof during said peak portions and substantially prevent operation thereof between said peak portions, whereby change of motor speed when said pulses are intermediate said slope portions is in the direction to effect synchronization.

20. In a color television system employing a scanning device operating in synchronism with a synchronizing signal of predetermined periodicity, and a cooperating movable color filter element, apparatus for effecting synchronization therebetween which comprises a non-synchronous motor driving said color filter element, a generator designed and adapted to produce a local signal having intervals of substantially constant value alternating with single cycles, each cycle having a positive and a negative excursion relative to said constant value with a slope between positive and negative peaks whose duration is short compared to the interval between cycles, driving means actuating said generator with said filter element to cause the periodicity of said local signal to vary with the filter element speed, a phase-comparing circuit supplied with said local and synchronizing signals and adapted to produce an output control wave which varies proportionally to the difference in phase between the synchronizing signal and the slope portions of said cycles, and speed control means supplied with said control wave for controlling the speed of said motor.

21. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element, a generator designed and adapted to produce a local signal having intervals of substantially constant value alternating with single cycles, each cycle having a positive and a negative excursion relative to said constant value with a slope between positive and negative peaks whose duration is short compared to the interval between cycles but longer than said synchronizing pulses, driving means actuating said generator with said filter element to cause the periodicity of said local signal to vary with the filter element speed, a phase-comparing circuit supplied with said local and synchronizing signals and adapted to produce an output control wave which varies proportionally to the difference in phase between the synchronizing signal and the slope portions of said cycles, and speed control means supplied with said control wave for controlling the speed of said motor, the direction of variation of said control wave being correlated with said speed control means to effect synchronization during said slope portions of the cycles.

22. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element, a variable reluctance generator having stator poles and a source of magnetomotive force therefor, a rotor for said generator having armature sections whose length is selected with respect to said poles to produce a local signal having intervals of substantially constant value alternating with single cycles, each cycle having a positive and a negative excursion relative to said constant value with a slope between positive and negative peaks whose duration is short compared to the interval between cycles but longer than said synchronizing pulses, driving means actuating said generator with said filter element to cause the periodicity of said local signal to vary with the filter element speed, a phase-comparing circuit supplied with said local and synchronizing signals and adapted to produce an output control wave which varies proportionally to the difference in phase between the synchronizing signal and the slope portions of said cycles, and speed control means supplied with said control wave for controlling the speed of said motor, the direction of variation of said control wave being correlated with said speed control means to effect synchronization during said slope portions of the cycles.

23. In a color television system employing a scanning device operating in synchronism with synchronizing signal pulses of predetermined periodicity, and a cooperating movable color filter element, apparatus for effecting synchronization therebetween which comprises a non-synchronous motor driving said color filter element, a variable reluctance generator having stator poles and a source of magnetomotive force therefor, a rotor for said generator having armature sections whose length is selected with respect to said poles to produce a local signal having intervals of substantially constant value alternating with single cycles, each cycle having a positive and a negative excursion relative to said constant value with a steep slope between positive and negative peaks whose duration is short compared to the interval between cycles but long compared to said synchronizing pulses, driving means actuating said generator with said filter element to cause the periodicity of said local signal to vary with the filter element speed, a phase-comparing circuit including a pair of grid-controlled thermionic tubes connected in parallel with the cathode of each tube connected to the anode of the other tube forming respective input and output circuits, a storage capacitor connected in said output circuit, connections supplying said local signal to said input circuit and said synchronizing signal pulses to the control grids of said tubes, whereby said capacitor assumes substantially the instantaneous voltage of the slope portions of said local signal during the simultaneous occurrence of said synchronizing signal pulses, motor speed control means, and connections supplying the voltage on said capacitor to said means to thereby control the motor speed, the direction of variation in said voltage with change of phase of said signals being correlated with the speed control means to effect stable synchronization during the slope portions of said local signal.

JOHN W. CHRISTENSEN.

References Cited in the file of this patent

UNITED STATES PATENTS

| Number | Name | Date |
|---|---|---|
| 2,319,789 | Chambers | May 25, 1943 |
| 2,323,905 | Goldmark | July 13, 1943 |
| 2,329,194 | Goldmark | Sept. 14, 1943 |
| 2,428,946 | Somers | Oct. 14, 1947 |
| 2,437,690 | Goldmark | Mar. 16, 1948 |
| 2,502,195 | Wood | Mar. 28, 1950 |
| 2,509,720 | Rome | May 20, 1950 |
| 2,509,729 | Rome | May 20, 1950 |